Jan. 6, 1959 W. J. BOWAN 2,867,243
DEVICE FOR CHANGING STOP VALVES
Filed Aug. 9, 1955

INVENTOR
WALTER J. BOWAN

BY Cushman, Darby & Cushman
ATTORNEYS

United States Patent Office 2,867,243
Patented Jan. 6, 1959

2,867,243

DEVICE FOR CHANGING STOP VALVES

Walter J. Bowan, Decatur, Ill., assignor to Mueller Co., Decatur, Ill., a corporation of Illinois Application August 9, 1955, Serial No. 527,261

7 Claims. (Cl. 138—89)

This invention relates to stop valve changing and more particularly to an improved plugging unit assembly to be used in changing stop valves and the like while under fluid pressure.

In my copending application, Serial No. 469,650, filed November 18, 1954, for Method and Apparatus for Changing Stops, there is disclosed an apparatus which includes a pressure chamber attachable to a stop valve when closed so as to permit the same to be opened when under pressure and a plugging unit assembly movable through the pressure chamber and the open stop valve so as to close off the flow of fluid through the stop valve, permitting the latter to be removed and replaced. In addition, a clamping device is provided which cooperates with the plugging unit assembly to exteriorly secure the latter to the conduit during the removal and replacement of the stop valve.

The plugging unit assembly comprises a rubber plug having an elongated tube secured to one end thereof and a draw rod secured to the other end thereof, the draw rod extending through the rubber plug and tube and being threadedly engaged with the remote end of the latter. In order to permit the stop valve to be changed, the elongated tube must have an outside diameter smaller than the inside diameter of the stop valve and hence, in dealing with smaller sized stop valves, the draw rod within the tube must of necessity be of rather frail construction.

Thus, if the rod or the threaded connection of the draw rod with the tube was to fail during the expansion of the rubber plug, the latter would immediately relax and release the pressure in the conduit. With the rod or the threaded connection of the tube and draw rod broken this suddenly released pressure may drive the tube back into the pressure chamber leaving the broken part of the draw rod extending through the stop and pressure chamber, thus, exposing the pressurized fluid to the atmosphere and preventing the closure of the stop valve. It will be readily understood that the blowing back of the tube as well as the escape to the atmosphere of a pressurized fluid, such as gas or the like, creates a dangerous hazard which can lead to disastrous results.

Accordingly, it is an object of the present invention to provide a device for changing stop valves which is constructed so as to overcome the hazardous conditions mentioned above.

Furthermore, during normal operation, it has been found that pressurized fluid leakage occurs between the draw rod and tube before the rubber stopper can be expanded into initial contact with the conduit. Since the leakage of even a small amount of some pressurized fluids is highly objectionable if not hazardous, this condition also constitutes a disadvantage of the plugging unit assemblies heretofore known.

It is, therefore, another object of the present invention to provide an improved plugging unit assembly which will not leak at any time during the normal stop changing operation.

Another object of the present invention is the provision of a plugging assembly having improved means for preventing excessive expansion of the plug thereof.

A still further object of the present invention is the provision of a novel plugging unit assembly which is easy to construct and assemble, simple and efficient in operation and economical to manufacture.

These and other objects of the present invention will become more apparent during the course of the following detailed description and appended claims.

The invention may best be understood with reference to the accompanying drawings wherein an illustrative embodiment is shown.

Figure 1:
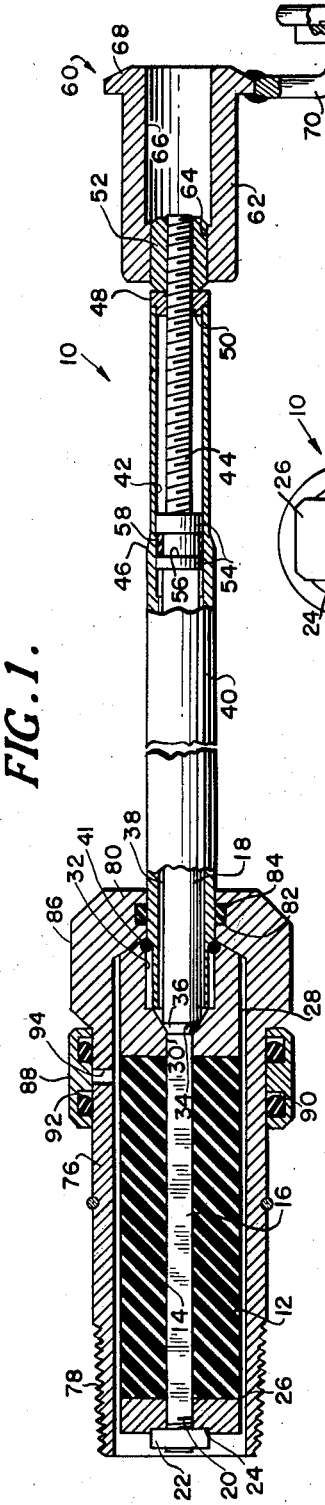
Figure 1 is a side elevational view, partly in section, of a plugging assembly embodying the principles of the present invention and showing the same in a relaxed condition operatively associated with a pressure chamber.
Figure 3:
Figure 3 is an end view of the plugging assembly.

Referring now more particularly to the drawings, there is shown in Figure 1 a plugging unit assembly, generally indicated at 10, embodying the principles of the present invention. The assembly 10 includes an expansible member 12 preferably in the form of a plug, made of rubber or other suitable resilient material, which is substantially rectangular in cross-section with cut-off corners.

The expansible member 12 is provided with a longitudinal passageway 14 of square cross-section which receives one end portion 16 of a draw rod 18 which end portion is also square in cross-section. The free end of the end portion 16 is threaded as at 20, to receive a nut 22 which also is preferably square. Nut 22 is adapted to seat with a registering square recess 24 formed in one lateral surface of an apertured member or ferrule 26, the other lateral surface of which abuts one end of the expansible member 12.

Disposed in abutting relation to the opposite end of the expansible member 12, is a second ferrule or member 28 having a central recess or aperture 30 of square cross-section extending inwardly from its plug engaging lateral surface for slidably receiving the end portion 16 of the rod 18. Extending inwardly from the opposite lateral face of the ferrule 28 is an enlarged concentric bore 32 and a frusto-conical bore 34 communicates the inner end of bore 32 with the inner end of the central aperture 30.

The frusto-conical bore 34 forms an abutment or shoulder for engaging a correspondingly shaped shoulder 36 formed between the draw rod end portion 16 and an enlarged central portion 38 thereof which preferably is of circular cross-section. Surrounding the draw rod 18 is an elongated tube 40 having one of its ends secured within the enlarged bore 32, as by welding 41. The opposite end portion of the tube 40 has a counterbore or recess 42 reamed or otherwise formed therein, through which a reduced threaded end portion 44 of the draw rod extends. This end portion of the tube is also reduced in exterior diameter to form an exterior annular shoulder 46 and has its open end closed by means of a washer 48 having an annular flange 50 engaged within the recess 42. A hexagonal nut 52 is threadedly mounted on the draw rod end portion 44 extending outwardly from the washer 48.

Disposed on the draw rod 18 between the central portion 38 and threaded end portion 44 thereof, is a pair of longitudinally spaced annular shoulders or collars 54 defining an annular recess 56 therebetween. An O-ring sealing element 58 is disposed within the recess 56 so that its outer periphery will form a pressure-tight seal between the draw rod and the recess 42 of the tube.

A removable crank, generally indicated at 60, is provided for turning nut 52 to effect the expansion of the rubber stopper 12. This crank 60 includes a socket or body member 62 having a hexagonal opening 64 extending inwardly from one end thereof and an enlarged bore 66 extending inwardly from its opposite end into communication with the opening 64. An annular flange 68 extends radially outwardly from the opposite end of the body member and has one end of a crank arm 70 secured thereto, as by welding or the like. The opposite end portion of the crank arm is reduced to receive a crank knob 72 which is rotatably retained thereon by means of a suitable washer 74 or the like.

The plugging assembly 10 is operatively associated with a stuffing box or pressure chamber preferably of the type disclosed in my above noted copending application. As shown in Figure 1, this pressure chamber comprises a hollow member 76 having exterior threads 78 formed on its inner end for engaging within the usual interior threads of the stop valve. The outer end of the hollow member terminates in a reduced portion 80 having an annular recess 82 formed therein for receiving an O-ring sealing member 84 which provides a pressure-tight seal between the hollow member and the tube 40. The outer surface of the hollow member adjacent the outer end thereof is provided with angular faces 86 which are hexagonal in cross-sectional configuration for engagement by a suitable securing tool, such as a wrench or the like. The central portion of the outer surface of the hollow member is cylindrical so as to receive a slidable collar 88 having a pair of spaced annular grooves 90 formed therein, within which a pair of O-ring sealing members 92, in the normal inoperative position of the collar 88 provide a pressure-tight seal with the central cylindrical exterior surface of the hollow member on both sides of an outlet port 94 extending through the wall thereof. Collar 88 may be moved into an operative position so as to expose the port 94 for the purpose of insuring that the engagement of the plug 12 within the conduit is pressure tight before the stop valve is removed.

The pressure chamber and the structural details thereof form no part of the present invention except insofar as the plugging assembly is combined therewith to provide an operative device capable of removing and replacing a stop valve while under pressure. Briefly, it will be noted that the plug end of the plugging assembly may be disposed within the hollow member so that the latter may be engaged within the free end of a closed stop valve. With the pressure chamber in pressure-tight engagement with the stop valve, the latter may be opened and the plug 12 moved therethrough into the end of the attached conduit. Crank 60 is then turned to expand the plug into engagement with the conduit to close off the flow to the stop valve, permitting the latter with the attached pressure chamber to be removed by sliding them off the rear end of the tube 40. The stop valve may be then repaired or a new one utilized which, along with the attached pressure chamber, is replaced on the conduit. The crank 60 may then be turned to release the expansion of the plug, the latter moved back through the open stop valve to within the hollow member, the stop valve closed, and the pressure chamber and plugging assembly removed.

As briefly mentioned above, the present plugging assembly is particularly desirable in that it is constructed to prevent a failure which might result in the blowing of the tube back into the pressure chamber so as to leave a broken draw rod extending through the open stop valve. This desirable feature is accomplished by providing a shouldered connection between the draw rod and tube at the plug end of the assembly thus insuring that the draw rod and tube will remain together in the event of a failure in the threaded outer end of the draw rod. The combined torsional and tensile forces acting on the outer threaded end of the draw rod are considerably greater than the sole tensile force acting on the threaded plug end of the draw rod so that the former will fail before the latter, if failure is to occur. It will be noted that if such failure should occur, draw rod shoulder 36 will abut ferrule bore 34 as the plug relaxes thus preventing tube 40, which is rigidly secured to ferrule 28, from blowing back without moving the rod therewith.

Furthermore, the provision of O-ring seal 58 prevents the escape of pressurized fluid which may flow through the plug and into the space between the draw rod and tube before the latter is initially expanded into contact with pressure containing conduit. Thus, the present plugging assembly effectively prevents any leakage of the pressurized fluid during the entire stop valve removing and replacing operation. In this regard, it is to be noted that shoulder 50 on washer 48 serves to positively center the draw rod within the outer end of the tube, which is recessed to receive the shoulder 50 and to provide a close tolerance within which the O-ring 59 seats.

Figure 2:
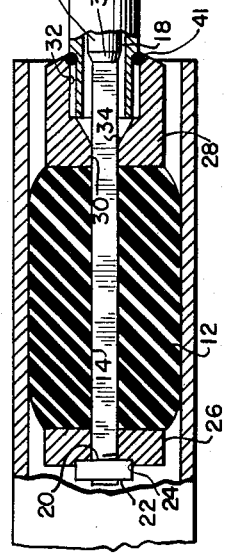
Figure 2 is a side elevational view, partly in section, showing the plugging assembly in its expanded operative position.

As best shown in Figure 2, the length of the threaded outer end portion of the draw rod is such that the free end thereof will be approximately flush with the outer end of crank socket 62 when the plug is sufficiently expanded in an average pipe. Extensive movement beyond this flush condition is prevented by the engagement of the outer shoulder 54 with the washer 48. These elements thus provide positive stop means operative to prevent excessive distortion of the plug which might result in fouling.

Another salient feature of the present invention is the simplicity with which the various component parts may be assembled. The plugging unit is assembled by first slipping draw rod 18 into the tube 40 until shoulder 36 abuts ferrule bore 34. Next, rubber plug 12 and ferrule 26 are slipped over the end portion 16 of the draw rod and nut 22 is initially engaged on the threaded end of the draw rod portion 16. Next, plug 12 is manually compressed somewhat and nut 22 is turned further down on the draw rod and aligned with the ferrule recess 24 so that upon releasing the plug, nut 22 will engage within the recess. In this manner, plug 12 acts as a spring to maintain nut 22 within recess 24, thus preventing the nut from backing off the draw rod. This construction also permits ready replacement of the plug when the same has become worn.

It is to be understood that the form of the invention herewith shown and described is to be taken as the preferred embodiment of the same and that various changes may be made without departing from the spirit of the invention or the scope of the appended claims.

I claim:

1. A plugging assembly comprising an elongated tube, a draw rod mounted for longitudinal movement within said tube and having an end portion of reduced exterior dimension forming a shoulder at the junction of said end portion with the remaining portion of said draw rod, a first ferrule rigidly secured to one end of said tube and having an aperture therein for slidably receiving said draw rod end portion and an abutment surrounding the inner end of said aperture for engagement by said draw rod shoulder so as to limit movement of said draw rod in the direction of said draw rod end portion, a second ferrule removably mounted on the free end of said draw rod end portion, an expansible member mounted on said draw rod end portion between said ferrules, and means on the opposite end portion of said draw rod acting against the opposite end of said tube for moving said draw rod longitudinally in the opposite direction so as to effect an expansion of said expansible member.

2. A plugging assembly as defined in claim 1 wherein said second ferrule is provided with a central recess in the outer surface thereof and wherein a nut is threadedly mounted on said draw rod free end for engagement within said recess, said recess being shaped to prevent the turning of said nut when the latter is engaged therein.

3. A plugging assembly comprising an elongated tube, a draw rod mounted for longitudinal movement within said tube and having an end portion extending outwardly from one end thereof, an expansible member surrounding said draw rod end portion and having its ends connected respectively with the outer end of said draw rod and said tube end, the opposite end of said tube having a counterbore extending inwardly therefrom, a washer engaging the end of said tube and having a shoulder engaging within said counterbore, a sealing ring disposed within said counterbore and forming a pressure-tight seal between said counterbore and the adjacent portion of said draw rod, the opposite end of said draw rod extending outwardly from said tube through said washer and having a nut threadedly mounted thereon in engagement with said washer, a removable crank for turning said nut to thereby expand said expansible member, and an annular shoulder disposed on said draw rod within said tube counterbore and operable to engage said washer shoulder so as to prevent excessive expansion of said expansible member.

4. A plugging assembly as defined in claim 3 wherein said sealing ring is mounted within an annular recess on said draw rod formed between said annular shoulder and a second annular shoulder spaced inwardly thereof.

5. A plugging assembly comprising an elongated tube, a draw rod mounted for longitudinal movement within said tube and having an end portion extending outwardly from one end of said tube, opposed abutments on the outer end of said rod end portion and on said tube end, respectively, an expansible member surrounding said draw rod end portion between said abutments for expansion by compression therebetween, means on the other end portion of said draw rod acting against the other end of said tube for moving said draw rod longitudinally relative to said tube in a direction to move said rod abutment toward said tube abutment to compress said expansible member, and interengageable means on said tube, at said one end thereof, and on the adjacent portion of said rod for limiting longitudinal movement of said tube relative to said rod in the direction of said other end thereof.

6. A plugging assembly as defined in claim 5 wherein said abutments comprise ferrules secured to said one draw rod end and to said one tube end respectively, the ferrule on said tube providing the interengageable means on said tube.

7. A plugging assembly as defined in claim 5 including interengageable abutment means disposed on said tube and said rod for limiting movement of the latter relative to the tube in the direction of the other end of the latter in order to prevent excessive compression of the expansible member.

References Cited in the file of this patent

UNITED STATES PATENTS

| | | |
|---|---|---|
| 607,492 | Nusser et al. | July 19, 1898 |
| 888,146 | Deasy | May 19, 1908 |
| 1,059,053 | Lennon | Apr. 15, 1913 |
| 1,644,118 | Florence | Oct. 4, 1927 |
| 1,997,878 | Wagner | Apr. 16, 1935 |
| 2,176,260 | Johnson | Oct. 17, 1939 |
| 2,299,365 | Valuch | Oct. 20, 1942 |
| 2,390,461 | Racz | Dec. 4, 1945 |